US008539195B2

(12) United States Patent
Wu et al.

(10) Patent No.: US 8,539,195 B2
(45) Date of Patent: Sep. 17, 2013

(54) NON-VOLATILE MEMORY DEVICE WITH NON-EVENLY DISTRIBUTABLE DATA ACCESS

(75) Inventors: Zining Wu, Los Altos, CA (US); Lau Nguyen, Sunnyvale, CA (US); Pantas Sutardja, Los Gatos, CA (US); Chi-Kong Lee, Fremont, CA (US); Tony Yoon, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/545,508

(22) Filed: Jul. 10, 2012

(65) Prior Publication Data

US 2012/0278545 A1 Nov. 1, 2012

Related U.S. Application Data

(63) Continuation of application No. 13/230,624, filed on Sep. 12, 2011, now Pat. No. 8,219,775, which is a continuation of application No. 12/025,371, filed on Feb. 4, 2008, now Pat. No. 8,019,959.

(60) Provisional application No. 60/889,078, filed on Feb. 9, 2007.

(51) Int. Cl.
*G06F 12/00* (2006.01)
*G06F 13/00* (2006.01)
*G06F 13/28* (2006.01)

(52) U.S. Cl.
USPC .......................... 711/171; 711/103; 711/154

(58) Field of Classification Search
USPC .......................................... 711/103, 154, 171
See application file for complete search history.

(56) References Cited

U.S. PATENT DOCUMENTS

| 6,684,289 | B1 * | 1/2004 | Gonzalez et al. | 711/103 |
| 6,757,800 | B1 * | 6/2004 | Estakhri et al. | 711/168 |
| 7,739,576 | B2 * | 6/2010 | Radke | 714/758 |
| 2002/0194438 | A1 * | 12/2002 | Lasser | 711/153 |
| 2005/0172179 | A1 * | 8/2005 | Brandenberger et al. | 714/718 |

FOREIGN PATENT DOCUMENTS

| EP | 1713085 | 10/2006 |
| WO | WO 2006108756 A1 * | 10/2006 |

OTHER PUBLICATIONS

International Search Report dated Sep. 16, 2008 from PCT/US2008/001669 (6 pages).

* cited by examiner

*Primary Examiner* — Ryan Bertram

(57) ABSTRACT

A system includes chips and a control module. Each of the chips includes an array of memory cells. Each of the arrays of memory cells includes rows of memory cells. Each of the rows of memory cells is configured to store a predetermined amount of data. The control module is configured to receive data, encode the data to generate blocks of encoded data, store a first portion of one of the blocks of encoded data in a first selected number row of a first chip, and store a remaining portion of the one of the blocks of encoded data in a second selected number row of a second chip. An amount of data in each of the blocks of encoded data is more than the predetermined amount of data. The second selected number row is a same number row or a higher number row than the first selected number row.

20 Claims, 13 Drawing Sheets

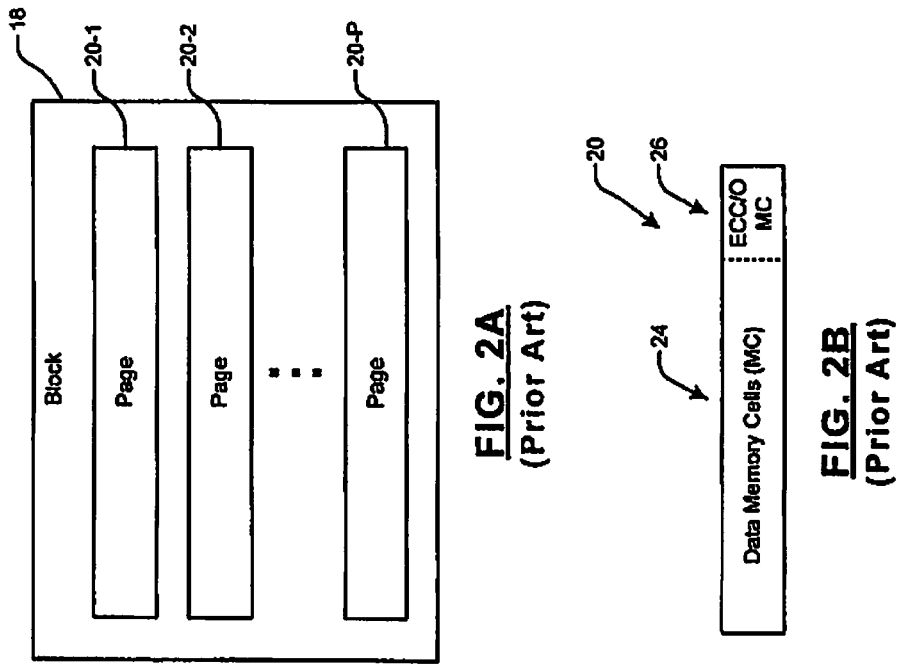
FIG. 2A (Prior Art)
FIG. 2B (Prior Art)
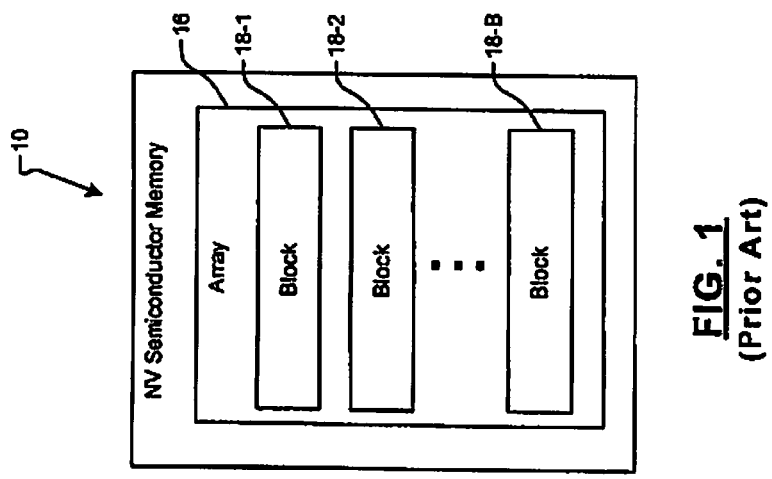
FIG. 1 (Prior Art)

NON-VOLATILE MEMORY DEVICE WITH NON-EVENLY DISTRIBUTABLE DATA ACCESS

CROSS-REFERENCE TO RELATED APPLICATIONS

This application is a continuation of U.S. patent application Ser. No. 13/230,624 (now U.S. Pat. No. 8,219,775), filed on Sep. 12, 2011 which is a continuation of U.S. patent application Ser. No. 12/025,371 (now U.S. Pat. No. 8,019,959), filed Feb. 4, 2008 which claims the benefit of U.S. Provisional Application No. 60/889,078, filed Feb. 9, 2007. The disclosures of the above applications are incorporated herein by reference in their entirety.

FIELD

The present disclosure relates to memory systems and, more particularly, to systems and methods for storing data in nonvolatile (NV) memory.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIGS. 1, 2A and 2B, nonvolatile (NV) semiconductor memory 10 may include flash memory, static random access memory (SRAM), nitride read only memory (NROM), phase change memory, magnetic RAM, multi-state memory, etc. The NV semiconductor memory 10 may include one or more arrays 16 that may each be arranged on one or more memory chips. The arrays 16 may include data structures, such as blocks and pages. The arrays 16 may therefore be arranged as B blocks 18-1, 18-2, . . . , and 18-B (collectively referred to as blocks 18).

In FIG. 2A, each block 18 includes P pages 20-1, 20-2, . . . , and 20-P (collectively referred to as pages 20). In FIG. 2B, each page 20 may include memory cells that are associated with a data portion 24 and may include other memory cells that are associated with an overhead data portion 26, such as error correcting code (ECC) data or other (O) overhead data.

Referring now to FIG. 2C, a memory drive may include one or more arrays 16-1, 16-2, . . . , and 16-C (collectively referred to as arrays 16) and each include blocks 18. Usually, the control module addresses the memory drive according to a hardwired physical block size. Pages 20 in the blocks 18 may also have a hardwired physical page size and may therefore be referred to as physical pages. The number of memory cells in the data and overhead portions of the pages 20 may also be hardwired.

For example only, a NAND flash array may include 2048 blocks for a total of 2 Gigabytes (GB) of memory. Each block may include 128 kilobytes (KB) in 64 pages. Each page 20 may include 2112 bytes. Of the 2112 bytes, 2048 bytes may be associated with the data portion and 64 bytes may be associated with the overhead portion. Each memory cell may store a bit.

The memory control module erases pages 20 and blocks 18 according to predetermined erase blocks 29-1, 29-2, . . . , and 29-R (collectively referred to as erase blocks 29). The memory control module generally requires data in an entire erase block to be erased simultaneously.

A host device may initiate a read operation and provide data files to the memory control module that are arranged in multiples of allocation units (AUs) of predefined size that fit in a physical block. AUs correspond to the smallest logical amount of memory space that can be allocated by the control module to store a file and may therefore be referred to as logical pages. Groupings of logical pages may be referred to as logical blocks.

When a write command is issued, data is sent in multiples of logical block size to the memory control module. The memory control module allocates the exact number of physical pages 20 to accommodate the logical pages. Even when ECC is used on logical page data, the number of parity bits are kept within the number of spare bits per overhead portion of a respective physical page. Therefore, one (ECC) coded logical page fits in an integer number of physical pages, and one coded logical block fits within an integer number of physical blocks.

SUMMARY

In general, in one aspect, this specification discloses a memory system including a nonvolatile memory, and a memory control module in communication with the nonvolatile memory. The nonvolatile memory includes memory cells arranged among physical memory blocks, wherein each physical memory block is of a predetermined size. The memory control module includes a write path module and a read path module. In response to the memory control module receiving data in a first format such that the data is evenly distributable among the physical memory blocks, the write path module is configured to modify the first format of the data into a second format prior to writing the data to the physical memory blocks. The second format of the data is such that the data is no longer evenly distributable among the physical memory blocks. The read path module is configured to read the data from the nonvolatile memory in accordance with the second format.

In general, in another aspect, this specification discloses a method for operating a memory system. The memory system includes a nonvolatile memory including memory cells arranged among physical memory blocks. Each of the physical memory blocks is of a predetermined size. A memory control module is in communication with the nonvolatile memory. The method includes, in response to the memory control module receiving data in a first format such that the data is evenly distributable among the physical memory blocks, modifying the first format of the data into a second format prior to writing the data to the physical memory blocks. The second format of the data is such that the data is no longer evenly distributable among the physical memory blocks. The data is read from the nonvolatile memory in accordance with the second format.

In still other features, the systems and methods described above are implemented by a computer program executed by one or more processors. The computer program can reside on a computer readable medium such as but not limited to memory, non-volatile data storage, and/or other suitable tangible storage mediums. Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of memory including blocks according to the prior art;

FIG. 2A illustrates pages within the blocks of memory according to the prior art;

FIG. 2B illustrates memory cells within the pages according to the prior art;

DETAILED DESCRIPTION

Figure 2C:
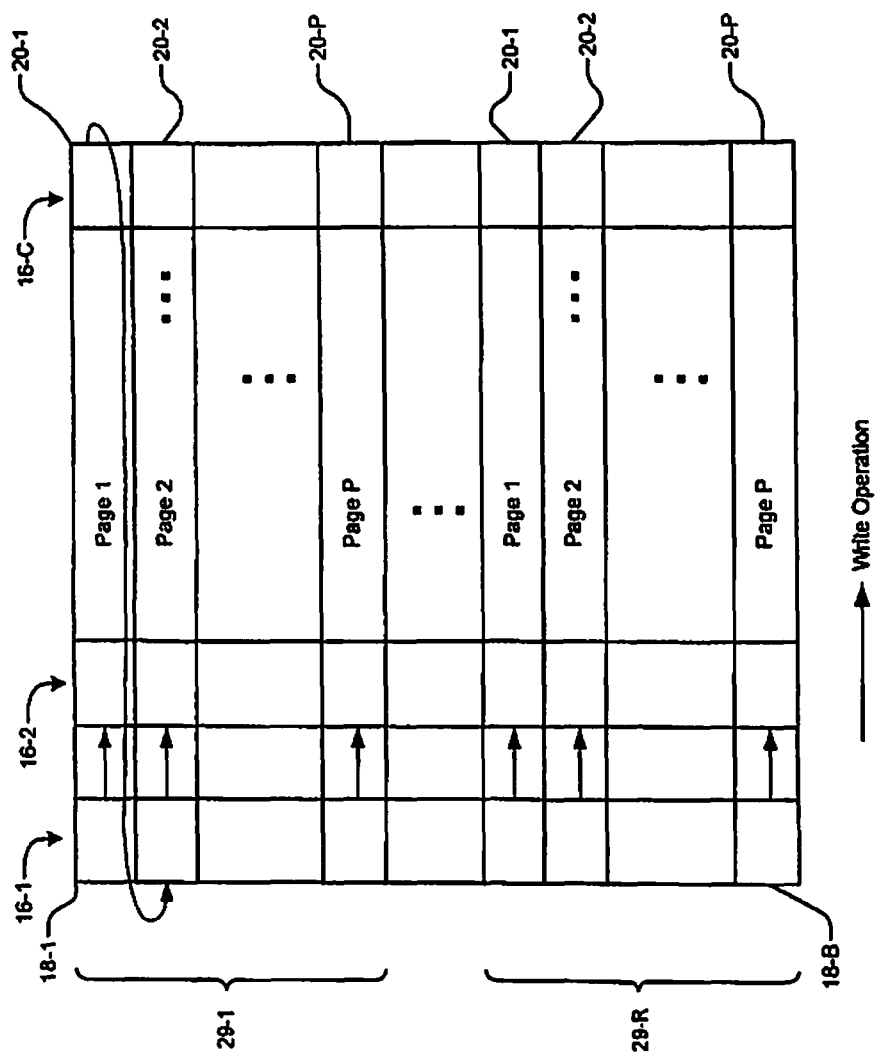
FIG. 2C illustrates memory arranged in erase blocks according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Previously, a host device interfaced with a memory control module according to logical data structures, such as logical pages or blocks of logical pages, that were restricted to a predetermined size. The memory control module encoded the data, and either one coded logical page contained an integer number of physical pages within memory, or a physical page within memory contained an integer number of coded logical pages.

In other words, there previously was an integer relationship between the logical page and physical page, although the relationship was not necessarily 1:1. For example, a logical page could be 0.5 kilobytes (KB) while a physical page could be 2 KB, or the logical page could be 4 KB while the physical page could be 2 KB. In either case, the logical page either completely fit in one physical page or was evenly distributed into several physical pages.

In the present disclosure, the memory control module may instead modify coded logical block (CLB) size and/or physical block size so that they are no longer integer multiples of each other. The CLBs may thus be spread among multiple arrays, which may be included on one or more memory chips. During a read operation, the memory control module may reformat data from the memory into groupings that conform to logical data structures of a host device interface. The host device may receive the data according to the logical data structures.

For example, a logical page can be 4.4 KB while a hardwired physical page is 2 KB. In this case, the logical page may be unevenly distributed into, for example, 3 physical pages. The first two pages contain 2 KB each, while the last physical page contains 0.4 KB of the logical page. Also, the last physical page may contain a first portion of the next logical page.

Figure 3A:
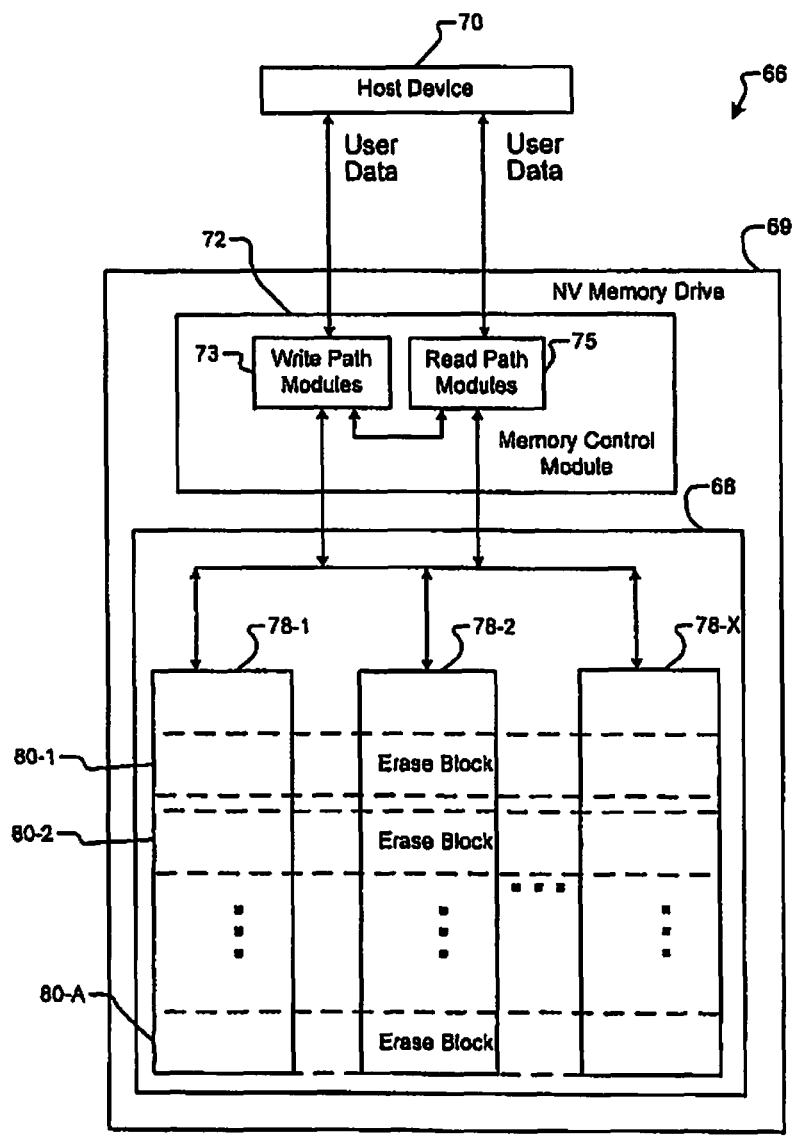
FIG. 3A is a functional block diagram of a memory system according to the present disclosure.

Referring now to FIG. 3A, a memory system 66 for a nonvolatile (NV) semiconductor memory 68, such as multi-level flash memory, is illustrated. In FIG. 3A, a host device 70 communicates with a solid state NV memory drive 69 that includes a memory control module 72 and the NV memory 68. The memory control module 72 may communicate with the memory 68 via write and read path modules 73, 75 that erase, write to and read from erase blocks 80-1, 80-2, . . . , and 80-A (collectively referred to as erase blocks 80).

The NV memory 68 may include one or more arrays 78-1, 78-2, . . . , and 78-X (collectively referred to as array 78) of memory cells that may each correspond to one or more memory chips. The array 78 may be arranged according to physical memory blocks of predetermined size that include physical pages of predetermined size. The memory control module 72 may receive data in logical blocks and/or logical pages from the host device 70 and generate a physical format for the data that differs from the hard-wired physical format of the NV memory 68. The generated physical format is modified from the physical format and may therefore be referred to as a modified physical format. In other words, the memory control module 72 may write data according to coded logical block size and not physical block size.

The memory control module 72 may reformat physical blocks, physical pages and erase blocks 80 to, for example, increase error correction code (ECC) rates for the data. Different ECC rates may be used to maintain integrity of the data. ECC rates may be represented by fractional numbers and may indicate the portion of the total amount of data that is not part of the ECC. In other words, if the code rate is k/n, for every k bits of useful information, the coder generates n bits of data, of which n-k are redundant.

For example, a rate of 0.9 ECC may be used. If user data is 4 KB per read/write operation, then the CLB size may be 4.4 KB, which is 4.4*8/6=5.87 physical pages (if each cell contains 3 bits, and each physical page contains 2048 (2K) cells, then physical page size may be 6 KB). Therefore, the CLB size may be larger than the physical block size, and CLB size may not be an integer multiple of the physical block size. Therefore, the memory control module 72 writes to the memory 68 based on the CLB size rather than the physical block size. As another example, if the ECC rate is 0.85, then CLB size may equal 4.7 KB, which is 6.27 physical pages. The present disclosure may support multiple (for example, rate 0.9 and rate 0.85) ECC codes and select from the different ECC code rates for a particular field.

Figure 3B:
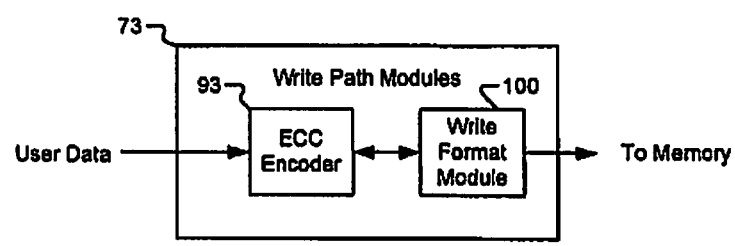
FIG. 3B is a functional block diagram of a write path module according to the present disclosure.

Referring now to FIG. 3B, the write path module 73 is illustrated. The write path module 73 may include an ECC encoder module 93 that encodes received data with an overhead portion. The ECC encoder module 93 may include a cyclic redundancy (CRC) module (not shown) that generates CRC bits based on user data. The ECC encoder module 93 may include other encoding modules, such as a Reed Solomon encoder module or a Bose-Chaudhuri-Hocquenghem (BCH)/Low Density Parity Check (LDPC) encoder module. The write path module 73 may also include a write format module 100 that generates the modified block and/or page format for the memory 68.

Figure 3C:
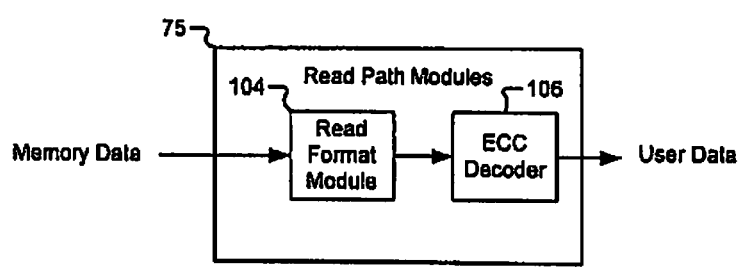
FIG. 3C is a functional block diagram of a read path module according to the present disclosure.

Referring now to FIG. 3C, a read path module 75 is illustrated. The read path module 75 includes a read format module 104 that reads data from the memory 68 based on the modified block and/or page format. The read path module 75 also includes an ECC decoder module 106 that decodes the read-back signals that were encoded by the ECC encoder module 93. The ECC decoder module may include, for example, a LDPC module, a Gray Code decoder module, a BCH decoder module, a Reed-Solomon decoder and/or a CRC decoder.

Figure 3D:
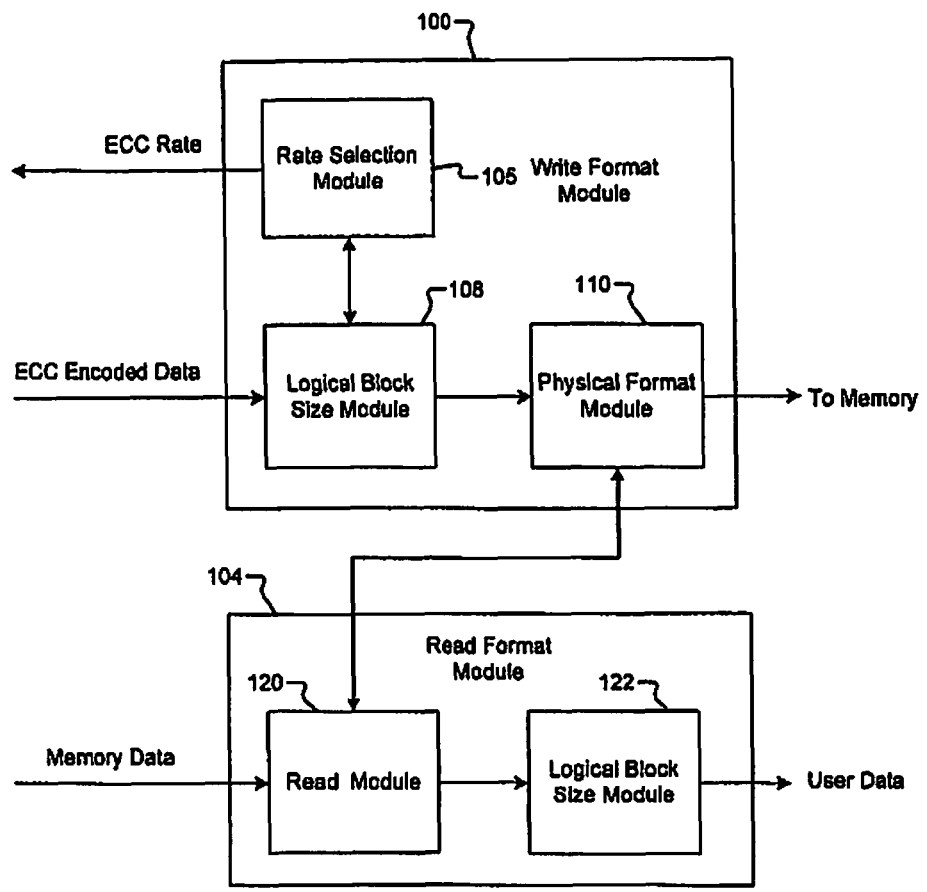
FIG. 3D is a functional block diagram of a write and read format modules according to the present disclosure.

Referring now to FIG. 3D, the write and read format modules 100, 104 may employ column and row select modules (not shown) to select memory cells within the NV memory 68. The write format module 100 may also include a rate selection module 105 that selects a rate for the ECC encoder module 93. Alternatively, an external rate selection module may select the ECC rate. During a write operation, a logical block size module 108 of the write format module 100 receives ECC encoded logical blocks of data and determines a size of the CLBs.

A physical format module 110 allocates a portion of the memory 68 based on the size of the CLBs. The allocated portion may be referred to as a modified physical block of data and may include any number of memory cells, such as a particular cell, a row of cells, a column of cells, a block of cells, a page of cells, erase blocks, etc. The physical format module 110 may erase data in an erase block that may or may not correspond to a predetermined erase block 80 of the NV memory 68. At least a portion of the erase block 80 is allocated for the modified physical block. The physical format module 110 writes to cells within the modified physical block of the NV memory 68. The physical format module 110 may also include memory (not shown) that stores a memory map based on modified blocks of data.

The read format module 104 may include a read module 120 that reads back data from the NV memory 68 according to the modified physical block as provided by the physical format module 110. During a read operation, the read module 120 selects read target cells, which may include any number of memory cells, such as a particular cell, a row of cells, a column of cells, a block of cells, a page of cells, etc. Once the read target cells are selected, the read module 120 reads the read target cells. A logical block size module 122 may then reapportion the data (before or after decoding) according to the original logical blocks/pages as when the data was sent to the memory control module 72.

Figure 4:
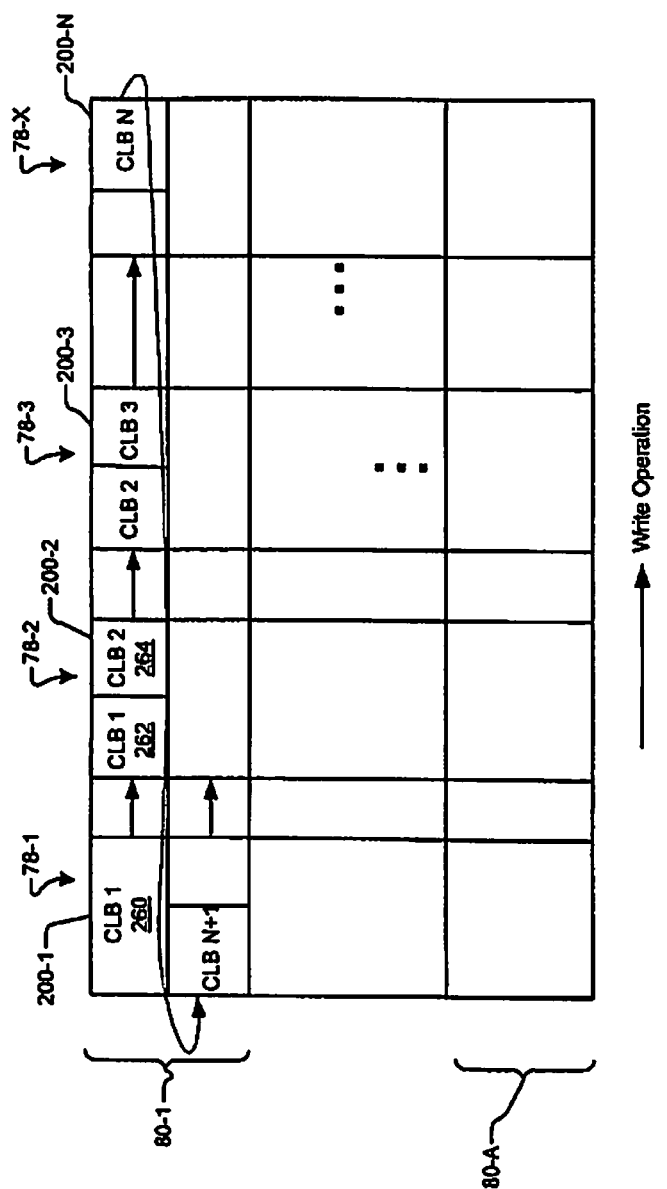
FIG. 4 illustrates a simplified memory map according to the present disclosure.

Referring now to FIG. 4, a modified memory map is shown for write/read operations. Arrays 78 are divided by erase blocks 80. The memory control module 72 writes CLBs 200-1, 200-2, . . . , and 200-N (collectively referred to as CLBs 200) across the arrays 78 regardless of the original physical size of data structures in the arrays 78. For example, the first CLB 200-1 fills the memory cells in a physical page of array 78-1 and also fills memory cells within part of a physical page within array 78-2.

The memory control module 72 may write to some or all of the arrays 78 in parallel. For example, when the memory control module 72 writes three CLBs (CLB 1, CLB 2, CLB 3), after encoding, the memory control module 72 may send a first part 260 of CLB 1 to the first array 78-1, and simultaneously send a second part 262 of CLB 1 with a first part 264 of the CLB 2 to the second array 78-2, etc.

Conventional NV memory drives use a page/erase block structure to store data. For example, a physical page may contain 2 KB of data plus an overhead area if each memory cell contains 1 bit of data. If each memory cell contains 3 bits of data, then the physical page size may be 6 KB. An erase block contains an integer number of physical pages. Typical size for erase block may range from 128 KB to 512 KB. Data in the erase block may be erased simultaneously.

In the present disclosure, the memory control module 72 may define logical page size to be, for example, 4 KB, so that write/read commands transfer a multiple of 4 KB of data between the memory control module 72 and the host device 70. Meanwhile, the memory control module 72 may define a physical block size to be, for example, 4.4 KB. The additional 0.4 KB of the modified physical block may correspond to an additional 0.4 KB of ECC added to the original 4 KB. In other words, logical page size (for example 4 KB) may be an integer multiple of physical page size (for example 4 KB) but differs from modified physical page size (for example 4.4 KB). Likewise, if the memory control module 72 defines logical block size as 4 KB, where logical block size is an integer multiple of physical block size (for example 4 KB), modified physical block size may be set to, for example, 4.4 KB, which is not an integer multiple of physical block size.

Figure 5:
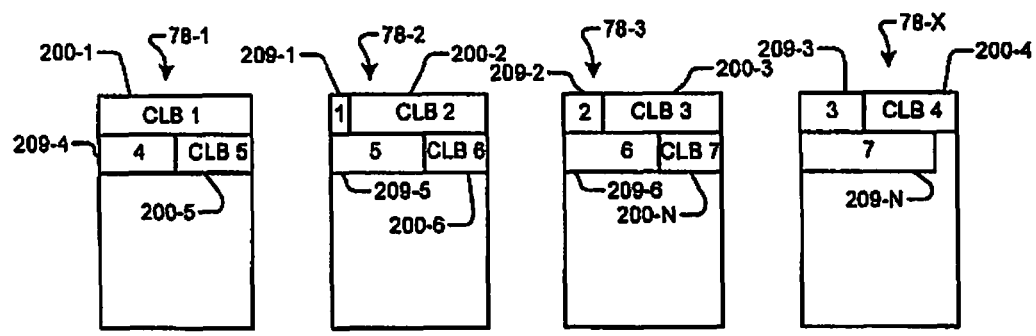
FIG. 5 illustrates a simplified memory map according to the present disclosure.
Figure 6:
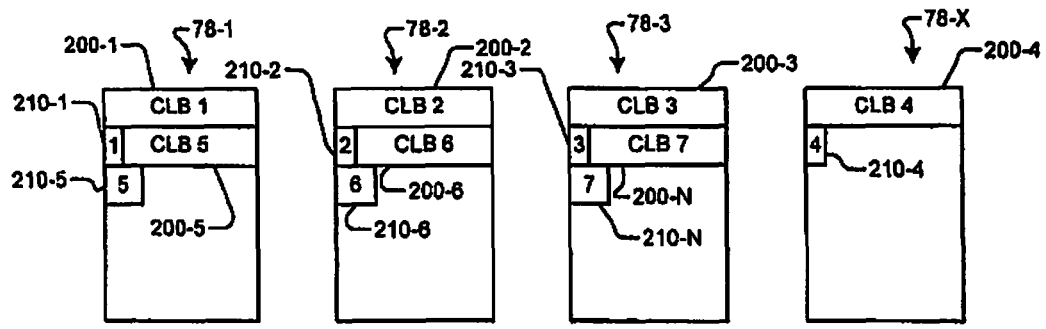
FIG. 6 illustrates a simplified memory map according to the present disclosure.

Referring now to FIGS. 5-6, simplified memory arrays 78 are provided to illustrate two exemplary methods for writing to the NV memory 68. The simplified memory arrays 78 include CLBs that are illustrated as integers (1-7). The first method, as in FIG. 5, includes spreading CLBs 200 across multiple arrays 78. Each of the CLBs 200 includes a portion 209-1, 209-2, . . . , and 209-N that overlaps two or more physical blocks in two or more arrays 78. The second method of FIG. 6 includes setting each CLB 200 in a single array. For parallel writing according to the second method, the memory control module 72 may define a buffer 210-1, 210-2, . . . , and 210-N in each array 78 to store a part of each of the CLBs 200 that exceeds (i.e. overflows) the physical blocks.

Figure 7:
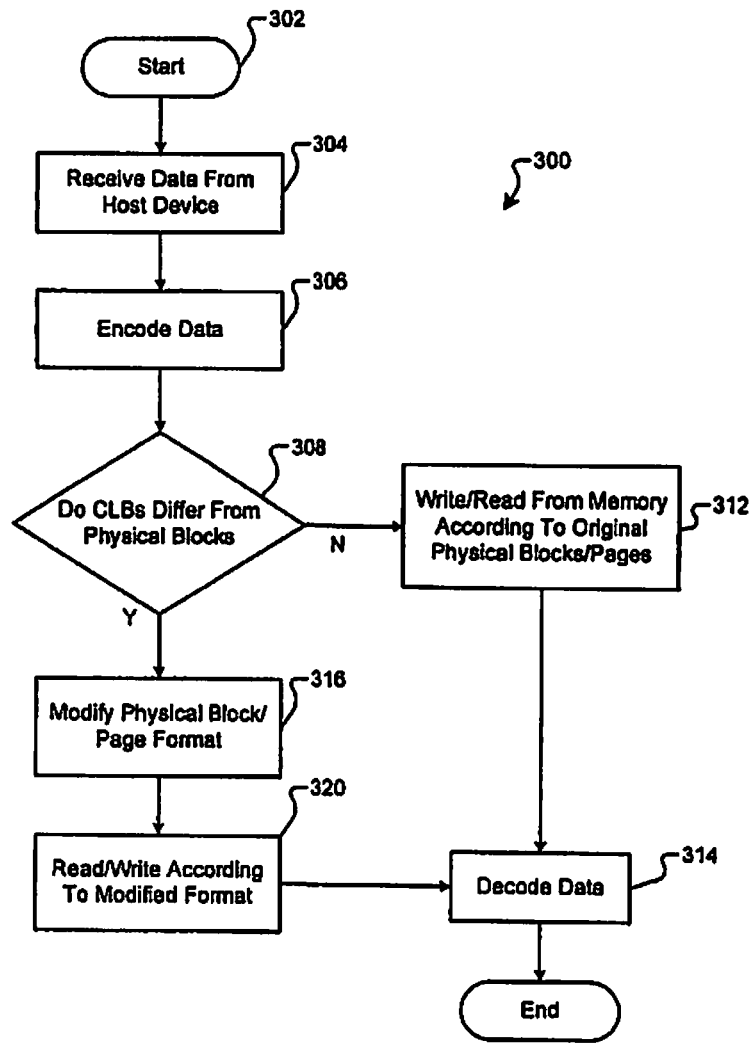
FIG. 7 illustrates a method for operating a memory system according to the present disclosure.

Referring now to FIG. 7 an exemplary method 300 for writing to and reading from memory is illustrated. Logic starts in step 302. In step 304, the memory control module 72 receives logical pages of data. In step 306, the memory control module 72 encodes the data. The encoding may be selectively based on a desired integrity for the data and/or may be predetermined. In step 308, if the CLBs match the physical blocks in memory, and control goes to step 312. In step 312, the memory control module 72 writes/reads from the memory and then decodes the data in step 314.

If in step 308 the CLBs differ from the physical blocks, the memory control module 72 modifies the physical blocks and/or pages in step 316. For example, if CLB size is 5.2 KB and physical block or page size is 4 KB, the memory control module 72 may request the memory drive to allocate enough space for the 5.2 KB CLB size for each write operation. The allocated memory space may be referred to as modified physical blocks or pages that would then, for example, include 5.2 KB. In step 320, the memory control module 72 writes/reads according to the modified physical blocks and/or pages.

The host device 70 may still transfer data using logical blocks/pages as the smallest unit, but the memory control module 72 may now accommodate high rate ECCs to the data before sending it to the memory drive. The present disclosure may also decrease write/read time by bypassing physical blocks and/or pages and by writing to multiple memory arrays simultaneously.

Referring now to FIGS. 8A-8G, various exemplary implementations incorporating the teachings of the present disclosure are shown.

Figure 8A:
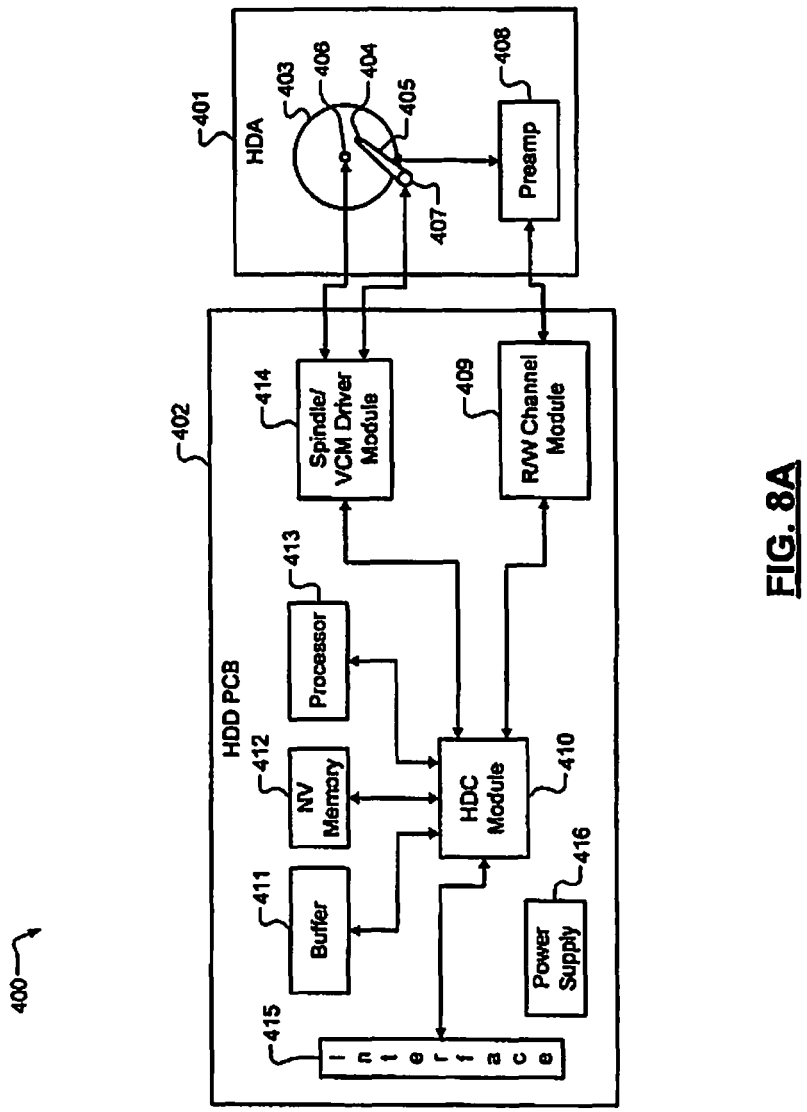
FIG. 8A is a functional block diagram of a hard disk drive.

Referring now to FIG. 8A, the teachings of the disclosure can be implemented in NV memory of a hard disk drive (HDD) 400. The HDD 400 includes a hard disk assembly (HDA) 401 and an HDD printed circuit board (PCB) 402. The HDA 401 may include a magnetic medium 403, such as one or more platters that store data, and a read/write device 404. The read/write device 404 may be arranged on an actuator arm 405 and may read and write data on the magnetic medium 403. Additionally, the HDA 401 includes a spindle motor 406 that rotates the magnetic medium 403 and a voice-coil motor (VCM) 407 that actuates the actuator arm 405. A preamplifier device 408 amplifies signals generated by the read/write device 404 during read operations and provides signals to the read/write device 404 during write operations.

The HDD PCB 402 includes a read/write channel module (hereinafter, "read channel") 409, a hard disk controller (HDC) module 410, a buffer 411, the NV memory 412, a processor 413, and a spindle/VCM driver module 414. The read channel 409 processes data received from and transmitted to the preamplifier device 408. The HDC module 410 controls components of the HDA 401 and communicates with an external device (not shown) via an I/O interface 415. The external device may include a computer, a multimedia device, a mobile computing device, etc. The I/O interface 415 may include wireline and/or wireless communication links.

The HDC module 410 may receive data from the HDA 401, the read channel 409, the buffer 411, NV memory 412, the processor 413, the spindle/VCM driver module 414, and/or the I/O interface 415. The processor 413 may process the data, including encoding, decoding, filtering, and/or formatting. The processed data may be output to the HDA 401, the read channel 409, the buffer 411, NV memory 412, the processor 413, the spindle/VCM driver module 414, and/or the I/O interface 415.

The HDC module 410 may use the buffer 411 and/or NV memory 412 to store data related to the control and operation of the HDD 400. The buffer 411 may include DRAM, SDRAM, etc. NV memory 412 may include any suitable type of semiconductor or solid-state memory, such as flash memory (including NAND and NOR flash memory), phase change memory, magnetic RAM, and multi-state memory, in which each memory cell has more than two states. The spindle/VCM driver module 414 controls the spindle motor 406 and the VCM 407. The HDD PCB 402 includes a power supply 416 that provides power to the components of the HDD 400.

Figure 8B:
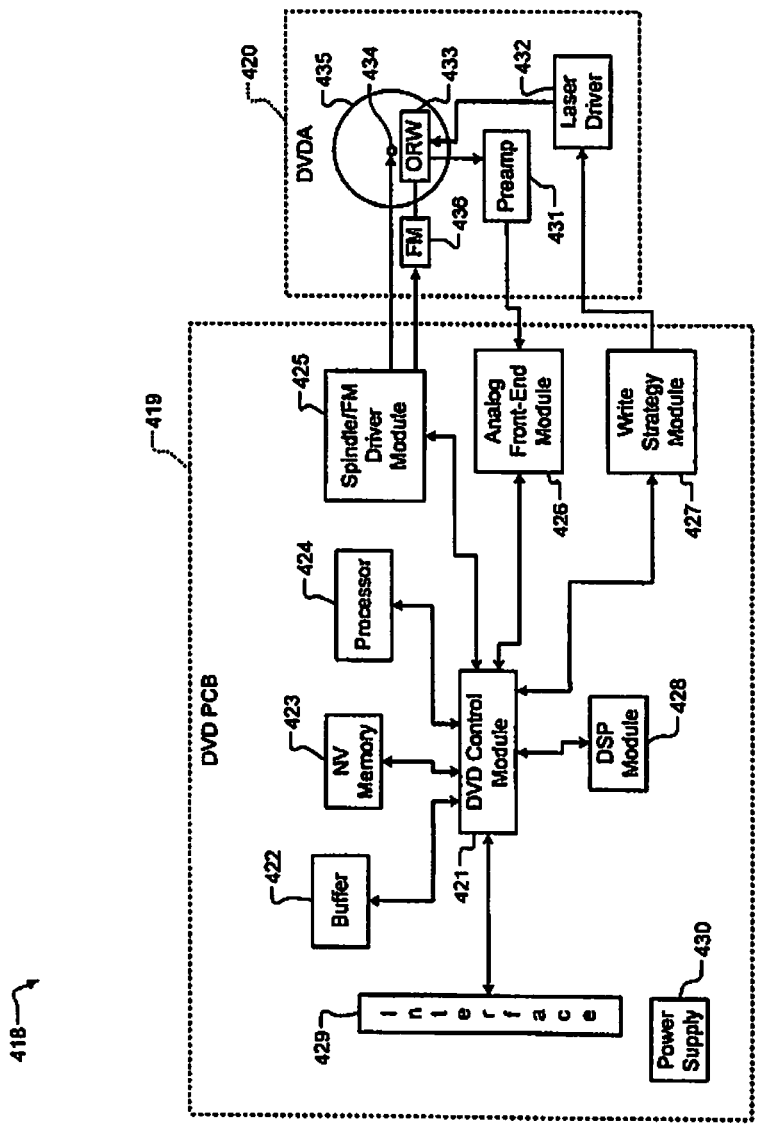
FIG. 8B is a functional block diagram of a DVD drive.

Referring now to FIG. 8B, the teachings of the disclosure can be implemented in NV memory of a DVD drive 418 or of a CD drive (not shown). The DVD drive 418 includes a DVD PCB 419 and a DVD assembly (DVDA) 420. The DVD PCB 419 includes a DVD control module 421, a buffer 422, the NV memory 423, a processor 424, a spindle/FM (feed motor) driver module 425, an analog front-end module 426, a write strategy module 427, and a DSP module 428.

The DVD control module 421 controls components of the DVDA 420 and communicates with an external device (not shown) via an I/O interface 429. The external device may include a computer, a multimedia device, a mobile computing device, etc. The I/O interface 429 may include wireline and/or wireless communication links.

The DVD control module 421 may receive data from the buffer 422, NV memory 423, the processor 424, the spindle/FM driver module 425, the analog front-end module 426, the write strategy module 427, the DSP module 428, and/or the I/O interface 429. The processor 424 may process the data, including encoding, decoding, filtering, and/or formatting. The DSP module 428 performs signal processing, such as video and/or audio coding/decoding. The processed data may be output to the buffer 422, NV memory 423, the processor 424, the spindle/FM driver module 425, the analog front-end module 426, the write strategy module 427, the DSP module 428, and/or the I/O interface 429.

The DVD control module 421 may use the buffer 422 and/or NV memory 423 to store data related to the control and operation of the DVD drive 418. The buffer 422 may include DRAM, SDRAM, etc. NV memory 423 may include any suitable type of semiconductor or solid-state memory, such as flash memory (including NAND and NOR flash memory), phase change memory, magnetic RAM, and multi-state memory, in which each memory cell has more than two states. The DVD PCB 419 includes a power supply 430 that provides power to the components of the DVD drive 418.

The DVDA 420 may include a preamplifier device 431, a laser driver 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver provides a read power to the optical device 433. The optical device 433 detects data from the optical storage medium 435, and transmits the data to the preamplifier device 431. The analog front-end module 426 receives data from the preamplifier device 431 and performs such functions as filtering and A/D conversion. To write to the optical storage medium 435, the write strategy module 427 transmits power level and timing data to the laser driver 432. The laser driver 432 controls the optical device 433 to write data to the optical storage medium 435.

Figure 8D:
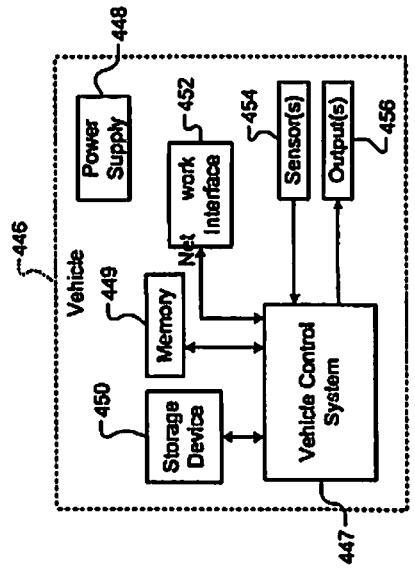
FIG. 8D is a functional block diagram of a vehicle control system.
Figure 8C:
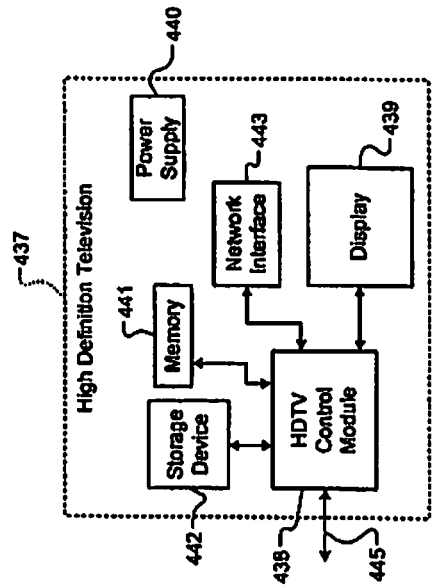
FIG. 8C is a functional block diagram of a high definition television.

Referring now to FIG. 8C, the teachings of the disclosure can be implemented in NV memory of a high definition television (HDTV) 437. The HDTV 437 includes an HDTV control module 438, a display 439, a power supply 440, the memory 441, a storage device 442, a network interface 443, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or NV memory. NV memory may include any suitable type of semiconductor or solid-state memory, such as flash memory (including NAND and NOR flash memory), phase change memory, magnetic RAM, and multi-state memory, in which each memory cell has more than two states. The storage device 442 may include an optical storage drive, such as a DVD drive, and/or a hard disk drive (HDD). The HDTV control module 438 communicates externally via the network interface 443 and/or the external interface 445. The power supply 440 provides power to the components of the HDTV 437.

Referring now to FIG. 8D, the teachings of the disclosure may be implemented in NV memory of a vehicle 446. The vehicle 446 may include a vehicle control system 447, a power supply 448, the memory 449, a storage device 450, and a network interface 452. If the network interface 452 includes a wireless local area network interface, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or NV memory. NV memory may include any suitable type of semiconductor or solid-state memory, such as flash memory (including NAND and NOR flash memory), phase change memory, magnetic RAM, and multi-state memory, in which each memory cell has more than two states. The storage device 450 may include an optical storage drive, such as a DVD drive, and/or a hard disk drive (HDD). The vehicle control system 447 may communicate externally using the network interface 452.

Figure 8F:
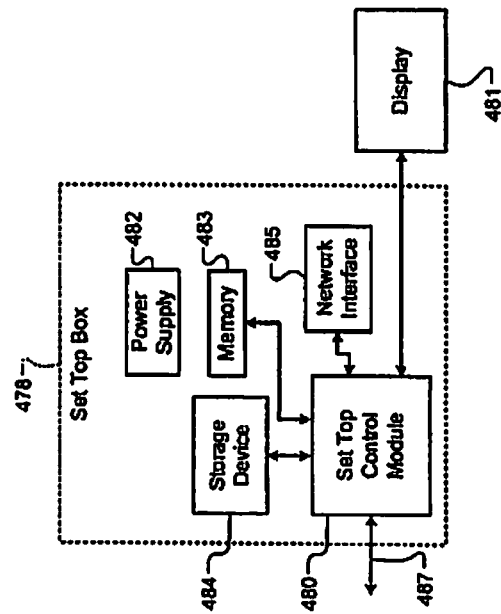
FIG. 8F is a functional block diagram of a set top box.
Figure 8E:
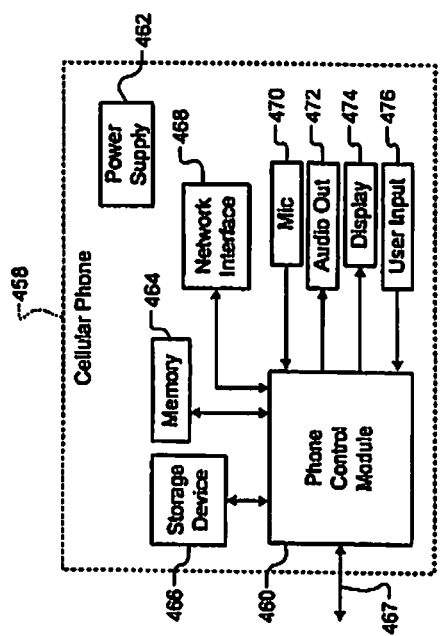
FIG. 8E is a functional block diagram of a cellular phone.

Referring now to FIG. 8E, the teachings of the disclosure can be implemented in NV memory of a cellular phone 458. The cellular phone 458 includes a phone control module 460, a power supply 462, the memory 464, a storage device 466, and a cellular network interface 467. The cellular phone 458 may include a network interface 468, a microphone 470, an audio output 472 such as a speaker and/or output jack, a display 474, and a user input device 476 such as a keypad and/or pointing device. If the network interface 468 includes a wireless local area network interface, an antenna (not shown) may be included.

The phone control module 460 may receive input signals from the cellular network interface 467, the network interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the network interface 468, and the audio output 472.

Memory 464 may include random access memory (RAM) and/or NV memory. NV memory may include any suitable type of semiconductor or solid-state memory, such as flash memory (including NAND and NOR flash memory), phase change memory, magnetic RAM, and multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 8F, the teachings of the disclosure can be implemented in NV memory of a set top box 478. The set top box 478 includes a set top control module 480, a display 481, a power supply 482, the memory 483, a storage device 484, and a network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or NV memory. NV memory may include any suitable type of semiconductor or solid-state memory, such as flash memory (including NAND and NOR flash memory), phase change memory, magnetic RAM, and multi-state memory, in which each memory cell has more than two states. The storage device 484 may include an optical storage drive, such as a DVD drive, and/or a hard disk drive (HDD).

Figure 8G:
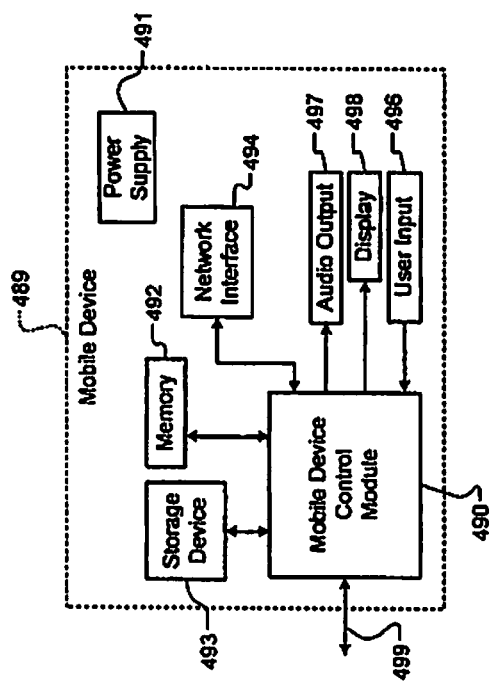
FIG. 8G is a functional block diagram of a mobile device.

Referring now to FIG. 8G, the teachings of the disclosure can be implemented in NV memory of a mobile device 489. The mobile device 489 may include a mobile device control module 490, a power supply 491, the memory 492, a storage device 493, a network interface 494, and an external interface 499. If the network interface 494 includes a wireless local area network interface, an antenna (not shown) may be included.

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or NV memory.

NV memory may include any suitable type of semiconductor or solid-state memory, such as flash memory (including NAND and NOR flash memory), phase change memory, magnetic RAM, and multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a plurality of chips comprising a first chip and a second chip, wherein each of the plurality of chips comprise an array of memory cells, wherein each of the arrays of memory cells comprises rows of memory cells, and wherein each of the rows of memory cells is configured to store a predetermined amount of data; and
   a control module configured to (i) receive data, (ii) encode the data to generate blocks of encoded data, (iii) store a first portion of one of the blocks of encoded data in a first selected number row of the first chip, and (iv) store a remaining portion of the one of the blocks of encoded data in a second selected number row of the second chip, wherein an amount of data in each of the blocks of encoded data is more than the predetermined amount of data, and wherein the second selected number row is a same number row or a higher number row than the first selected number row.

2. The system of claim 1, wherein the first selected number row is a same number row as the second selected number row.

3. The system of claim 1, wherein the second selected number row is a number row one higher than the first selected number row.

4. The system of claim 1, wherein:
   the blocks of encoded data are arranged in a logical data structure format; and
   the logical data structure format includes at least one of a logical page of data and a logical block of data; and
   the control module is configured to store the blocks of encoded data based on the logical data structure format.

5. The system of claim 1, wherein:
   the blocks of encoded data comprise a logical page of data;
   the logical page of data comprises a first portion and a remaining portion; and
   the control module is configured store (i) the first portion of the logical page of data in a first array of the first chip, and (ii) the remaining portion of the logical page of data in a second array of the second chip.

6. The system of claim 1, wherein:
   the blocks of encoded data comprise a logical block of data;
   the logical block of data comprises a first portion and a remaining portion; and
   the control module is configured store (i) the first portion of the logical block of data in a first array of the first chip, and (ii) the remaining portion of the logical block of data in a second array of the second chip.

7. The system of claim 1, wherein:
   the encoded blocks of data comprise a first encoded block of data and a second encoded block of data;
   the first chip comprises a physical page of memory cells; and
   the control module is configured to allocate (i) a first portion of the physical page of memory cells for storing a first portion of the first encoded block of data, and (ii) a remaining portion of the physical page of memory cells for storing a first portion of the second encoded block of data.

8. The system of claim 7, wherein the control module is configured to allocate (i) the first portion of the physical page of memory cells for storing a remaining portion of the first encoded block of data, and (ii) the remaining portion of the physical page of memory cells for storing the remaining portion of the second encoded block of data.

9. The system of claim 7, wherein:
   the second chip comprises a second physical page of memory cells; and
   the control module is configured to allocate (i) a first portion of the second physical page of memory cells for storing a remaining portion of the first encoded block of data, and (ii) a remaining portion of the second physical page of memory cells for storing the remaining portion of the second encoded block of data.

10. The system of claim 1, wherein the control module is configured to (i) select one of a plurality of error correction code rates prior to encoding the data to generate blocks of encoded data, and (ii) generate the blocks of encoded data based on the selected error correction code rate.

11. The system of claim 1, wherein the control module is configured to store the first portion of the one of the blocks of encoded data in the first selected number row of the first chip while storing the remaining portion of the one of the blocks of encoded data in the second selected number row of the second chip.

12. The system of claim 1, wherein:
   the blocks of encoded data comprise a first encoded block of data and a second encoded block of data;
   the first chip comprises a first array of memory cells;
   the second chip comprises a second array of memory cells; and
   the control module is configured to store a first portion of the first encoded block of data in the first array of memory cells while storing a second portion of the first encoded block of data in the second array of memory cells.

13. The system of claim 12, wherein the control module is configured to store a first portion of the second encoded block of data in the second array of memory cells while storing (i) the first portion of the first encoded block of data in the first array of memory cells, and (ii) the second portion of the first encoded block of data in the second array of memory cells.

14. A method comprising:
   receiving data;
   encoding the data to generate blocks of encoded data;
   storing a first portion of one of the blocks of encoded data in a first selected number row of a first chip of a plurality of chips; and
   storing a remaining portion of the one of the blocks of encoded data in a second selected number row of a second chip of the plurality of chips, wherein the second selected number row is a same number row or a higher number row than the first selected number row, and wherein
   each of the plurality of chips comprises an array of memory cells,
   each of the arrays of memory cells comprises rows of memory cells,
   each of the rows of memory cells is configured to store a predetermined amount of data, and
   an amount of data in each of the blocks of encoded data is more than the predetermined amount of data.

15. The method of claim 14, further comprising storing (i) a first portion of a logical page of data in a first array of the first chip, and (ii) a remaining portion of the logical page of data in a second array of the second chip,
   wherein the blocks of encoded data comprise the logical page of data.

16. The method of claim 14, further comprising storing (i) a first portion of a logical block of data in a first array of the first chip, and (ii) a remaining portion of the logical block of data in a second array of the second chip, wherein the blocks of encoded data comprise the logical block of data.

17. The method of claim 14, further comprising allocating (i) a first portion of a physical page of memory cells for storing a first portion of a first encoded block of data, and (ii) a remaining portion of the physical page of memory cells for storing a first portion of a second encoded block of data,
wherein the first chip comprises the physical page of memory cells.

18. The method of claim 17, further comprising allocating (i) the first portion of the physical page of memory cells for storing a remaining portion of the first encoded block of data, and (ii) the remaining portion of the physical page of memory cells for storing the remaining portion of the second encoded block of data.

19. The method of claim 17, further comprising allocating (i) a first portion of a second physical page of memory cells for storing a remaining portion of the first encoded block of data, and (ii) a remaining portion of the second physical page of memory cells for storing the remaining portion of the second encoded block of data,
wherein the second chip comprises the second physical page of memory cells.

20. The method of claim 14, further comprising:
storing a first portion of a first encoded block of data in a first array of memory cells while storing a second portion of the first encoded block of data in a second array of memory cells, wherein the first chip comprises the first array of memory cells, and wherein the second chip comprises the second array of memory cells; and
storing a first portion of a second encoded block of data in the second array of memory cells while storing (i) the first portion of the first encoded block of data in the first array of memory cells, and (ii) the second portion of the first encoded block of data in the second array of memory cells.

* * * * *